United States Patent
Chong et al.

(10) Patent No.: US 9,046,886 B2
(45) Date of Patent: Jun. 2, 2015

(54) SYSTEM AND METHOD FOR LOGGING SECURITY EVENTS FOR AN INDUSTRIAL CONTROL SYSTEM

(75) Inventors: Justin Brandon Chong, Salem, VA (US); David Richard Socky, Roanoke, VA (US); Manas Ranjan Sahoo, Hyderabad (IN)

(73) Assignee: General Electric Company, Schenectady, NY (US)

(*) Notice: Subject to any disclaimer, the term of this patent is extended or adjusted under 35 U.S.C. 154(b) by 104 days.

(21) Appl. No.: 13/460,779

(22) Filed: Apr. 30, 2012

(65) Prior Publication Data

US 2013/0291115 A1 Oct. 31, 2013

(51) Int. Cl.
G06F 21/00 (2013.01)
G05B 19/048 (2006.01)
G06F 21/55 (2013.01)

(52) U.S. Cl.
CPC ............ *G05B 19/048* (2013.01); *G06F 21/554* (2013.01)

(58) Field of Classification Search
CPC .. G06F 21/554; G05B 23/027; G05B 19/048; H04L 12/2419
See application file for complete search history.

(56) References Cited

U.S. PATENT DOCUMENTS

| | | | |
|---|---|---|---|
| 5,774,652 A | 6/1998 | Smith | |
| 6,092,202 A | 7/2000 | Veil et al. | |
| 6,449,732 B1 | 9/2002 | Rasmussen et al. | |
| 6,694,434 B1 | 2/2004 | McGee et al. | |
| 6,826,690 B1 | 11/2004 | Hind et al. | |
| 7,222,228 B1 | 5/2007 | Stephens, Jr. et al. | |
| 7,246,002 B2 | 7/2007 | Healy et al. | |
| 7,340,600 B1 | 3/2008 | Corella | |
| 7,412,524 B1 | 8/2008 | Gupta et al. | |
| 7,536,548 B1 | 5/2009 | Batke et al. | |
| 7,577,848 B2 | 8/2009 | Schwartz et al. | |
| 7,649,452 B2 | 1/2010 | Zilberstein et al. | |
| 7,877,627 B1 | 1/2011 | Freydel | |
| 8,015,791 B2 | 9/2011 | Finkbeiner | |
| 8,121,707 B2 | 2/2012 | Karaffa et al. | |
| 8,707,032 B2 | 4/2014 | Socky et al. | |
| 8,726,372 B2 | 5/2014 | Sahoo et al. | |

(Continued)

FOREIGN PATENT DOCUMENTS

DE 102008038913 A1 2/2010
EP 0891611 A1 1/1999

(Continued)

OTHER PUBLICATIONS

U.S. Appl. No. 13/460,721, filed Apr. 30, 2012, Sahoo et al.

(Continued)

*Primary Examiner* — Matthew Henning
(74) *Attorney, Agent, or Firm* — Fletcher Yoder, P.C.

(57) ABSTRACT

A system includes a security server including a memory and a processor configured to receive a first set of communications from a human machine interface (HMI) device, wherein the first set of communications relates to HMI device security events. The security server is also configured to receive a second set of communications from an industrial controller, wherein the second set of communications relates to industrial controller security events. The security server is further configured to package and send the received first and second sets of communications to a remote managed security service provider (MSSP) for analysis.

20 Claims, 3 Drawing Sheets

(56) References Cited

U.S. PATENT DOCUMENTS

| | | | |
|---|---|---|---|
| 2002/0095269 A1* | 7/2002 | Natalini et al. | 702/188 |
| 2003/0016819 A1 | 1/2003 | Cheng | |
| 2003/0226038 A1* | 12/2003 | Raanan et al. | 713/201 |
| 2005/0076203 A1 | 4/2005 | Thornton et al. | |
| 2005/0114708 A1* | 5/2005 | DeStefano et al. | 713/201 |
| 2005/0213768 A1 | 9/2005 | Durham et al. | |
| 2006/0253465 A1 | 11/2006 | Willis et al. | |
| 2006/0259809 A1* | 11/2006 | Mishra et al. | 714/4 |
| 2006/0285693 A1 | 12/2006 | Raikar | |
| 2007/0162609 A1 | 7/2007 | Pope et al. | |
| 2007/0220602 A1* | 9/2007 | Ricks et al. | 726/22 |
| 2007/0260116 A1 | 11/2007 | Shigemori et al. | |
| 2008/0155084 A1* | 6/2008 | Yu et al. | 709/223 |
| 2008/0163182 A1 | 7/2008 | Breault | |
| 2008/0168564 A1 | 7/2008 | Lerouge et al. | |
| 2008/0175388 A1 | 7/2008 | Okabe et al. | |
| 2008/0301716 A1* | 12/2008 | McKelvey et al. | 719/328 |
| 2009/0049430 A1 | 2/2009 | Pai et al. | |
| 2009/0077638 A1 | 3/2009 | Norman et al. | |
| 2009/0083287 A1 | 3/2009 | Bell et al. | |
| 2009/0094250 A1 | 4/2009 | Dhuse et al. | |
| 2009/0169006 A1 | 7/2009 | Zick et al. | |
| 2009/0171479 A1 | 7/2009 | Oosako | |
| 2009/0276550 A1 | 11/2009 | Megarity | |
| 2009/0319773 A1 | 12/2009 | Frenkel et al. | |
| 2009/0328183 A1 | 12/2009 | Frenkel et al. | |
| 2010/0036773 A1 | 2/2010 | Bennett | |
| 2010/0146588 A1 | 6/2010 | Bergerson et al. | |
| 2010/0185857 A1 | 7/2010 | Neitzel et al. | |
| 2010/0192208 A1 | 7/2010 | Mattsson | |
| 2010/0275039 A1 | 10/2010 | Frenkel et al. | |
| 2010/0313264 A1 | 12/2010 | Xie et al. | |
| 2011/0039237 A1* | 2/2011 | Skare | 434/118 |
| 2011/0299679 A1 | 12/2011 | Yamaguchi et al. | |
| 2012/0030761 A1 | 2/2012 | Baba et al. | |
| 2012/0036568 A1 | 2/2012 | Kodama | |
| 2012/0159650 A1* | 6/2012 | Cho et al. | 726/34 |
| 2012/0198541 A1 | 8/2012 | Reeves | |
| 2012/0226917 A1 | 9/2012 | Wiseman et al. | |
| 2012/0240212 A1 | 9/2012 | Wood et al. | |
| 2012/0246555 A1 | 9/2012 | Masten | |
| 2013/0030765 A1 | 1/2013 | David | |
| 2013/0067551 A1 | 3/2013 | Frew et al. | |
| 2013/0110298 A1 | 5/2013 | Beveridge | |
| 2013/0139242 A1 | 5/2013 | Zhu | |
| 2013/0287208 A1 | 10/2013 | Chong et al. | |
| 2013/0290729 A1 | 10/2013 | Pettigrew et al. | |
| 2013/0291085 A1 | 10/2013 | Chong et al. | |
| 2013/0291115 A1 | 10/2013 | Chong et al. | |

FOREIGN PATENT DOCUMENTS

| | | |
|---|---|---|
| EP | 0891611 B1 | 1/1999 |
| EP | 1608123 A1 | 12/2005 |
| JP | 2005100164 | 4/2005 |
| JP | 2007061191 | 3/2007 |
| JP | 2008283789 | 11/2008 |
| JP | 2008283792 | 11/2008 |
| JP | 2008284160 | 11/2008 |
| WO | 2005069823 A2 | 8/2005 |

OTHER PUBLICATIONS

U.S. Appl. No. 13/460,759, filed Apr. 30, 2012, Socky et al.
U.S. Appl. No. 13/460,794, filed Apr. 30, 2012, Chong et al.
U.S. Appl. No. 13/460,801, filed Apr. 30, 2012, Chong et al.
U.S. Appl. No. 13/460,771, filed Apr. 30, 2012, Pettigrew et al.
Okhravi, Hamed; "Data Diodes in Support of Trustworthy Cyber Infrastructure"; Apr. 21-23; Oak Ridge; Tennessee; USA Copyright 2010; pp. 1-4; ACM 978-1-4503-0017-9.
Dierks, T., et al., "The Transport Layer Security (TLS) Protocol Version 1.2; rfc5246.txt", Aug. 1, 2008, pp. 1-104, Switzerland.
Freier, A., et al., "The Secure Sockets Layer (SSL) Protocol Version 3.0; rfc6101.txt," Aug. 13, 2011, pp. 1-67, Switzerland.
Ball, E., et al., "Role-based access control with X.509 attribute certificates," IEEE Internet Computing, Mar. 1, 2003, pp. 62-69, Volume No. 7, Issue No. 2, United States.
Cooper, D., et al., "Internet X.509 Public Key Infrastructure Certificate and Certificate Revocation List (CRL) Profile; rfc5280.txt", May 1, 2008, pp. 1-151.
PCT Search Report and Written Opinion dated Dec. 12, 2013, issued in connection with corresponding WO Application No. PCT/US2013/062522.
Simon et al., RFC 5216: The EAP-TLS Authentication Protocol, Mar. 2008, pp. 1-34.
Farrell et al., RFC 5755: An Internet Attribute Certificate Profile for Authorization, Jan. 2010, IETF, pp. 1-50.

* cited by examiner

SYSTEM AND METHOD FOR LOGGING SECURITY EVENTS FOR AN INDUSTRIAL CONTROL SYSTEM

BACKGROUND OF THE INVENTION

The subject matter disclosed herein relates to industrial control systems and, more particularly, to securing the operation of industrial control systems.

Industrial control systems, such as automated power generation systems (e.g., wind, water, and gas turbine systems) and automated manufacturing systems (e.g., petroleum refineries, chemical manufacturing plants, and the like) are a common feature of modern industry. For such industrial control systems, an industrial controller may generally control the operation of the system. For example, certain devices in the industrial control system (e.g., sensors, pumps, valves, actuators, and the like) may be controlled by, and may report data to, the industrial controller. Furthermore, the industrial controller may execute instructions (e.g., firmware and/or applications) that may generally enable the industrial controller to control the operation of the industrial control system (e.g., a gas turbine system). Additionally, other devices, such as human machine interface (HMI) devices, may be coupled to the industrial control system to provide an interface by which a user may control the operation of the industrial controller and the industrial control system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a security server including a memory and a processor configured to receive a first set of communications from a human machine interface (HMI) device, wherein the first set of communications relates to HMI device security events. The security server is also configured to receive a second set of communications from an industrial controller, wherein the second set of communications relates to industrial controller security events. The security server is further configured to package and send the received first and second sets of communications to a remote managed security service provider (MSSP) for analysis.

In a second embodiment, a method includes aggregating security logs including security events for a plurality of devices associated with an industrial system. The method further comprises packaging and sending the aggregated security logs to a managed security service provider (MSSP), wherein the MSSP is configured to determine trends in the security logs.

In a third embodiment, a tangible, non-transitory, computer-readable medium is configured to store instructions executable by a processor of an electronic device. The instructions include instructions to receive security notifications from a human machine interface (HMI) device and an industrial controller, wherein the HMI device is configured to execute a configuration tool that provides instructions to the industrial controller. The instructions also include instructions to send the received security notifications to a remote processor, wherein the remote processor is configured to analyze and compare the security notifications from the HMI device and the industrial controller. The instructions further include instructions to provide an alert when the remote processor indicates a security problem with the HMI device, the industrial controller, or both, based on the security notifications.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Also, as used herein, the term "whitelist" may refer to a file which includes a list identifying executable files that are authorized to run on an industrial controller. Additionally, the term "authorized" may be used herein to refer to an executable file that is verified to be from a trustworthy source (i.e., the software developer) and whose contents are verified as being the same as when it was provided by the trustworthy source.

It may generally be desirable to track certain activities of the various components of an industrial control system to ensure that the components behave as intended. As such, present embodiments include a security server that is coupled to the industrial control system in order to aggregate security notifications pertaining to the various security-related activities of the components of the industrial control system. Additionally, certain disclosed security server embodiments may further package and transmit the aggregated security notifications to a remote device, such as a device that is hosted and maintained by a managed security service provider (MSSP) of the industrial control system, for comparison and analysis. Furthermore, the processor of the remote device may compare and analyze the various security notifications of the industrial control system received from the security server in order to identify trends within the security notifications that may point to security concerns within the industrial control system. As such, the remote device may inform (e.g., provide security alerts to) the security server, and possibly a HMI device, about the security concerns within the industrial control system such that they may be addressed.

Figure 1:
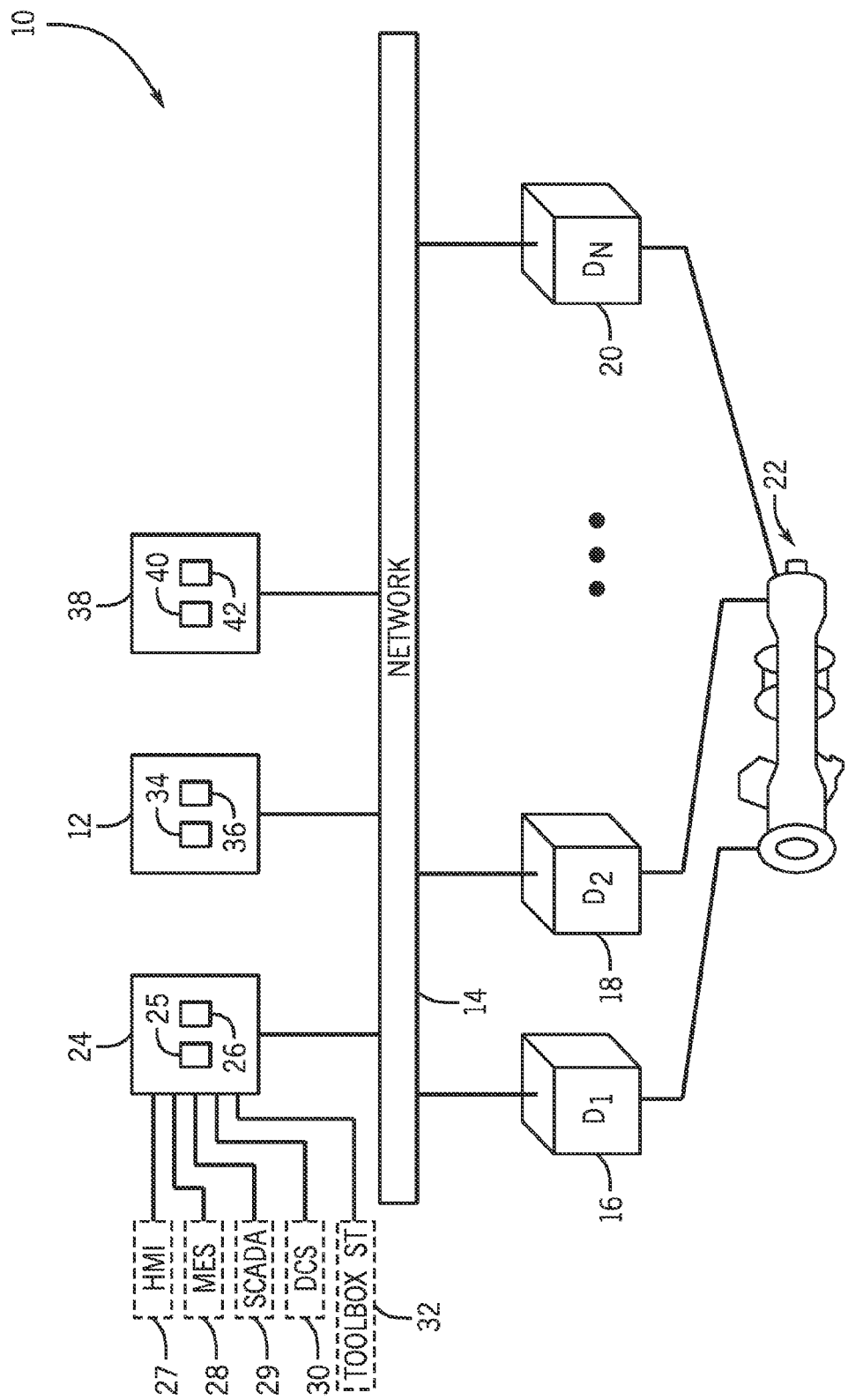
FIG. 1 is a schematic diagram of an embodiment of an industrial control system having an industrial controller, a human machine interface (HMI device) and a security server, in accordance with aspects of the present disclosure.

With the foregoing in mind, FIG. 1 is a schematic diagram illustrating an industrial control system 10. The illustrated industrial control system 10 includes an industrial controller 12. Additionally, the industrial controller 12 (e.g., a Mark™Vie, or any other Mark™ industrial controller available from General Electric of Schenectady, N.Y.) may be coupled to a network 14 to control the operation of a number of field devices 16, 18 and 20. For example, the illustrated industrial controller 12 receives sensory data from a number of field devices 16, 18, and 20 (e.g., temperature sensors, pressure sensors, voltage sensors, control valves, actuators, or similar field devices for an industrial control system) via the network 14 to monitor and control the operation of a gas turbine system 22. In other embodiments, rather than a gas turbine system 22, the system being monitored and controlled by the industrial control system 10 may include, for example, any automated manufacturing systems (e.g., petroleum refinery systems, chemical production systems, gasification systems, or similar automated manufacturing system) or automated power generation systems (e.g., power plants, steam turbine systems, wind turbine systems, and similar automated power generation systems). For example, in an embodiment, a gasification system may include a gasifier configured to gasify a carbonaceous feedstock to generate a synthetic gas, a gas treatment unit is configured to process the synthetic gas to remove undesirable elements (e.g., acid gases), a combustor configured to combust the synthetic gas to drive a turbine, and a generator coupled to the turbine configured to produce electrical power. In such an embodiment, the industrial controller 12 may monitor and control the various components of the gasification system (e.g., the gasifier, gas treatment unit, combustor, and turbine) using at least the field devices 16, 18, and 20.

For the illustrated industrial control system 10, the field devices 16, 18, and 20 are communicatively coupled to the industrial controller 12 (e.g., via the network 14) while monitoring and controlling various aspects and parameters of the operation of the gas turbine system 22 (e.g., monitoring the temperature in a combustor of the gas turbine system, controlling the voltage output of an electrical generator coupled to a shaft of the gas turbine system, regulating a flow of a fuel into the combustor, controlling a steam input of a heat recovery steam generator (HRSG), and the like). It should be appreciated that the illustrated industrial control system 10 represents a simplified industrial control system, and that other industrial control systems may include any suitable number of industrial controllers 12, networks 14, networking devices, field devices, etc., to monitor and control portions of any automated system 22.

In the depicted embodiment, industrial controller 12 may use the network 14 for communicating with and controlling any one of the field devices 16, 18, or 20. For example, the industrial controller 12 may reside in an industrial plant and may be configured to adjust one or more process conditions related to the devices 16, 18, 20. The network 14 may be any electronic and/or wireless network suitable for enabling communications, and may include fiber media, twisted pair cable media, wireless communications hardware, Ethernet cable media (e.g., Cat-5, Cat-7), and the like. Further, the network 14 may include several sub-buses, such as a high speed Ethernet sub-bus suitable for connecting components of the industrial control system 10 at communication speeds of 100 MB/sec and upwards. Additionally, the network 14 may include an input/output (I/O) network, such as an I/O network conforming to the Institute of Electrical and Electronics Engineers (IEEE) 802.3 standard. The network 14 may also include an H1 network sub-bus suitable for connecting components of the industrial control system 10 at communications speeds of approximately 31.25 Kb/sec. The sub-buses may intercommunicate with each other, for example, by using linking devices or gateways, such as those gateways available under the designation FG-100 provided by softing AG, of Haar, Germany, and/or I/O packs available from General Electric Co. of Schenectady, N.Y. Indeed, a number of interconnected sub-buses of the network 14 may be used to communicate amongst the components of the industrial control system 10.

The industrial controller 12, including memory 34 and processor 36, may execute instructions (e.g., binary instructions in executable files) to generally control the operation of the industrial control system 10. For example, the memory 34 of the industrial controller 34 may include one or more files including binary instructions that may be performed by the processor 36 in order to control and monitor the field devices 16, 18, and 20 disposed within portions of the gas turbine system 22. These executable files may, for example, be initially installed in the memory 34 of the industrial controller 12 by the manufacturer of the industrial controller 12 before the industrial controller 12 is installed in the industrial control network 10. Furthermore, the executable files stored in the memory 34 of the industrial controller 12 may occasionally be updated (e.g., using the device 24 discussed below), for example, to augment the features of previous software versions as well as improve performance.

Also communicatively coupled to the industrial controller 12 (e.g., via the network 14 or another suitable network) is the device 24, including a memory 25 and a processor 26, which may host a human machine interface (HMI) system 27, a manufacturing execution system (MES) 28, a supervisor control and data acquisition (SCADA) system 29, a distributed control system (DCS) 30, or similar interface systems. In particular, in certain embodiments, the device 24 may host a configuration application or tool, such as ToolboxST™ (represented by element 32), available from General Electric Co., of Schenectady, N.Y. In general, the aforementioned systems may provide one or more interfaces by which a user may monitor and control the operation of the industrial controller 12. For example, the HMI 27 and/or the ToolboxST 32 may provide a user interface through which various parameters of the industrial control system 10 (e.g., stored in the memory 34 of the industrial controller 12) may be forced or set. By further example, the HMI 27 and/or the ToolboxST 32 may include an interface through which the various executable files stored in the memory 34 of the controller 12 may be updated to different versions. In certain embodiments, the aforementioned systems may be hosted on a single device 24, while, in other embodiments, they may each be installed on one or more devices in the industrial control network.

Also part of the illustrated industrial control system 10, a security server 38 having a memory 40 and a processor 42 may be communicatively coupled to the industrial controller 12 and the device 24 (e.g., via the network 14 or another suitable network). Generally speaking, the security server 38 may perform a number of functions pertaining to the security of the industrial control system 10. For example, in certain embodiments, the security server 38 may be responsible for hosting a certificate authority (CA) that may issue and revoke certificates for communicating over the network 14 in a secure manner by enabling the verification of identities as well as encrypted communication channels when certain components (e.g., industrial controller 12, ToolboxST 32 on device 24, or other components of the industrial control system 10) are communicating on the network 14.

Moreover, the security server 38 may receive security notifications from the various components of the industrial control system 10. During the operation of a particular component, such as the industrial controller 12 of the industrial control system 10, the industrial controller 12 may generate security notifications pertaining to, for example, the various tasks performed by the industrial controller 12, attempts to access and/or log onto the industrial controller 12, instructions received by the industrial controller 12, and/or errors encountered during operation of the industrial controller 12. The security notifications may initially be stored in the memory 34 of the industrial controller 12 and may be subsequently transferred to the security server 38 (e.g., via the network 14). In certain embodiments, the industrial controller 12 may provide the security notifications to the security server 38 as the security notifications occur (e.g., in a substantially real-time fashion), while in other embodiments, the industrial controller 12 may collect a certain number (e.g., 2, 3, 4, 5, 10, 20, or any suitable number) of security notifications before providing them to the security server 38. Similarly, in certain embodiments, the device 24 (e.g., the HMI 27 and/or the ToolboxST 32 on device 24) may also provide the security server 38 with security notifications, for example, relating to the various tasks performed by the device 24, attempts to access and/or log onto the device 24, instructions received by the device 24 from a user, instructions provided by the device 24 to the industrial controller 12, and/or errors encountered during the operation of the device 24 (e.g., the HMI 27 and/or the ToolboxST 32 on device 24). Indeed, any of the various devices of the industrial control system 10, including, for example, the field devices 16, 18, and 20, may provide the security server 38 with security notifications.

Figure 2:
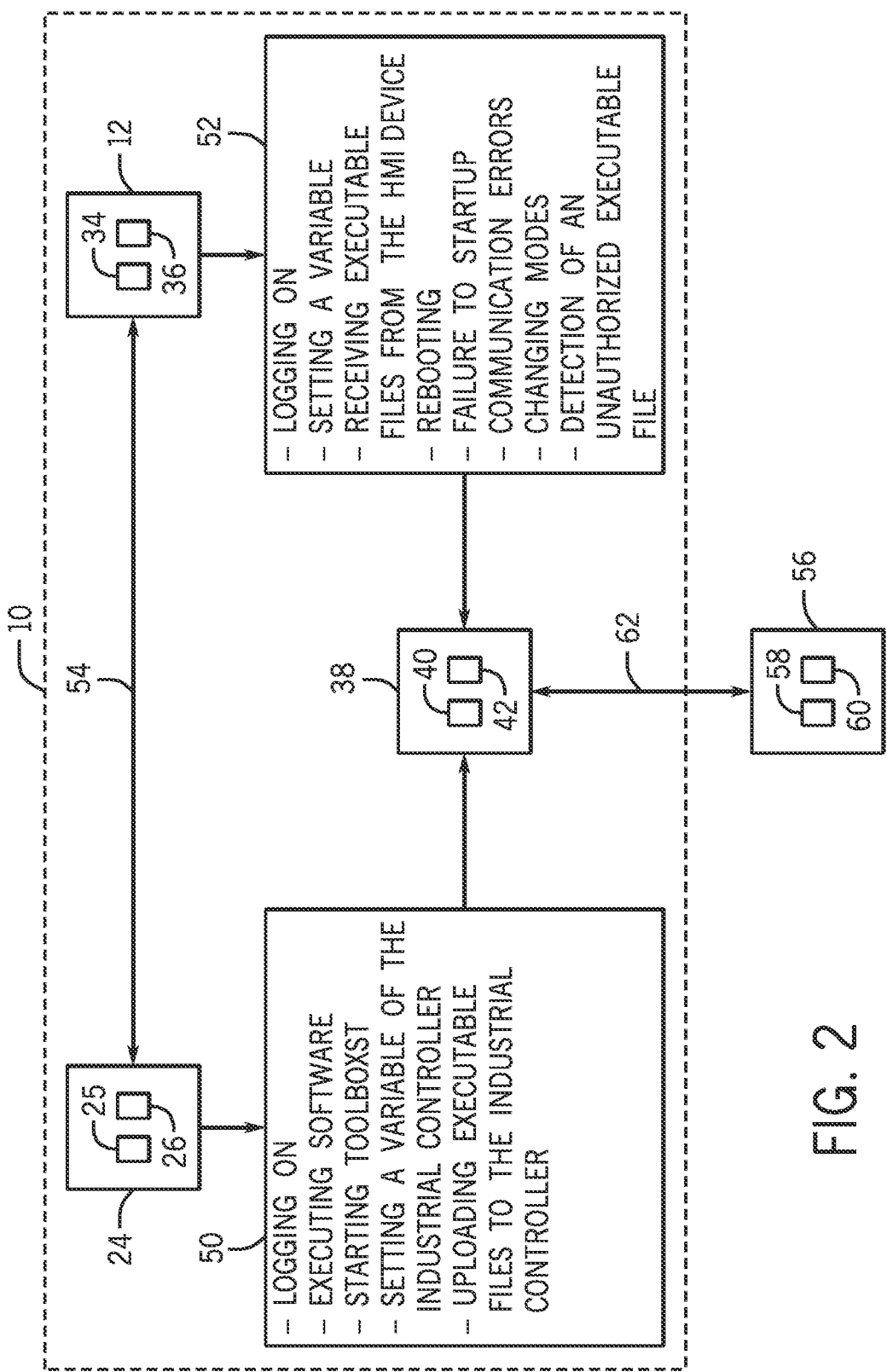
FIG. 2 is a hybrid flow diagram illustrating an embodiment of the security server managing HMI device security events and industrial controller security events, in accordance with aspects of the present disclosure.

To further illustrate the operations of the security server 38, FIG. 2 is a hybrid flow diagram illustrating an embodiment of the security server 38 managing HMI device security events 50 and industrial controller security events 52 in an industrial control system 10. More specifically, FIG. 2 illustrates the device 24 (e.g., hosting the HMI 27 and/or ToolboxST 32) and the industrial controller 12 communicatively coupled to one another, as indicated by the arrow 54, such that the device 24 may generally provide an interface for a user to access and control the industrial controller 12. Throughout the operations of the device 24 (e.g., the HMI 27 and/or the ToolboxST 32 on device 24) a number of HMI security events 50 may be generated and subsequently delivered to the security server 38 (e.g., via the network 14). Furthermore, during the operation of the industrial controller 12 a number of industrial controller security events 52 may be generated and subsequently delivered to the security server 38 (e.g., via the network 14). It should be appreciated that elements representing HMI security events 50 of FIG. 2, as well as the industrial controller security events 52 of FIG. 2, include a non-limiting lists of examples of security events that may be encountered during the respective operations of the device 24 and the industrial controller 12 that may produce security notifications for later consumption by the security server 38.

In particular, as illustrated in FIG. 2, one of the potential HMI security events 50 involves a user attempting to log on to the device 24. Accordingly, when a user attempts to log on to the device 24, the HMI 27, and/or ToolboxST 32, the device 24 may generate and provide to the security server 38 a security notification corresponding to the HMI security event. Furthermore, these security notifications provided to the security server 38 may include information (e.g., a timestamp, a username, various machine and/or user identifiers, an indication of success or failure, a number of attempts in a given time period, or other suitable information) pertaining to the HMI security event. Similarly, when software is executed by the processor 26 of the device 24 (e.g., based on instructions from a user), the device 24 may also generate a security notification including information (e.g., a timestamp, a name of the software being executed, a hash key value for the software being executed, various machine and/or user identifiers, or other suitable information) pertaining to the HMI security event. By specific example, the device 24 may generate a HMI security notification when a configuration tool, such as ToolboxST 32, is started (e.g., begins execution) on the device 24.

Additionally, the device 24 may generate a HMI security event when the device 24 attempts to set or force a variable of the industrial controller 12. That is, the industrial controller 12 may include a number of variables stored in the memory 34 of the industrial controller 12 that may generally define parameters (e.g., acceptable temperature, pressure, or voltage ranges for the various components of the gas turbine system 22) of the industrial control system 10. As such, a user may utilize an interface of device 24 (e.g., the HMI 27 and/or the ToolboxST 32) to instruct the industrial controller 12 to set or force a particular variable to a specified value. Furthermore, when the device 24 instructs the industrial controller 12 to set or force a particular variable, the device 24 may generate a security notification to be sent to the security server 38 specifying information (e.g., a timestamp, identifying information for the user, machine, and/or variable being set, the specified value for the variable, the current or previous value of the variable, or other suitable information) pertaining to the HMI security event. Furthermore, in certain embodiments, a user may utilize an interface of device 24 (e.g., the HMI 27 and/or the ToolboxST 32 on device 24) to upload executable files to the memory 34 of the industrial controller 12 for later execution by the processor 36 of the industrial controller 12. As such, when the device 24 provides the executable files to the industrial controller 12, the device 24 may also provide the security server 38 with a security notification including information (e.g., a timestamp, identifying information for the user, machine, and/or executable file being transferred, a hash key value for the executable file being transferred, or other suitable information) pertaining to the HMI security event.

Additionally, as illustrated in FIG. 2, the industrial controller 12 may also generate and provide security notifications to the security server 38 in response to certain industrial controller security events 52. For example, one of the potential industrial controller security events 52 may occur when a user and/or system attempts to log onto the industrial controller 12. Accordingly, when a user and/or device attempts to log on to the industrial controller 12 (e.g, via the HMI 27 or ToolboxST 32 of the device 24), the industrial controller 12 may generate a security notification corresponding to the industrial controller security event, and then provide the security notification to the security server 38. Furthermore, the security notification provided to the security server 38 may include information (e.g., a timestamp, a username, various machine and/or user identifiers, an indication of success or failure, a number of attempts in a given time period, or other suitable information) pertaining to the industrial controller security event. Additionally, as set forth above, the industrial controller 12 may receive instructions (e.g., from the HMI 27 and/or ToolboxST 32 of device 24) to set or force a variable in the memory 34 of the industrial controller 12. Accordingly, upon receiving the instructions, the industrial controller 12 may generate a security notification for the industrial controller security event including information (e.g., a timestamp, identifying information for the user, machine, and/or variable being set, the specified value for the variable, the current or previous value of the variable, or other suitable information) pertaining to the industrial controller security event.

Furthermore, as set forth above, the industrial controller 12 may, at times, receive executable files from another system (e.g., the HMI 27 and/or the ToolboxST 32 on device 24) for storage in memory 34 and execution by processor 36 of the industrial controller 12. As such, when the industrial controller 12 receives the executable files from the device 24, the industrial controller 12 may also provide the security server 38 with a security notification including information (e.g., a timestamp, identifying information for the user, machine, and/or executable file being transferred, a hash key value for the executable file being transferred, or other suitable information) pertaining to the industrial controller security event. Other examples of industrial controller security events 52 include: a reboot of the industrial controller 12, a failure of the industrial controller 12 to start or boot up, and communication errors encountered by the industrial controller 12. In certain embodiments, the industrial controller 12 may operate in a number of different modes (e.g., an open, non-restricted mode and a secure, restricted mode), and the industrial controller 12 may generate a security notification upon changing the mode of operation (e.g., from open mode to secure mode). For all such industrial controller security events 52, the industrial controller 12 may generally provide relevant information pertaining to the security event to the security server 38 in the associated security notification.

Additionally, in certain embodiments, the industrial controller 12 may store a whitelist file in the memory 34 as a method of regulating which executable files are allowed to execute on the processor 36 of the industrial controller 12. That is, when the industrial controller 12 receives new executable files (e.g., from device 24), it may also receive a whitelist file including a hash key value (e.g., the output of a hash function such as Cyclic Redundancy Check (CRC), Message-Digest Algorithm (MD), Secure Hash Algorithm (SHA), or other suitable hash function) for each authorized executable file. Accordingly, in certain embodiments, the processor 36 of the industrial controller 12 may determine the hash key value of a particular executable file that is attempting execution, and then the industrial controller 12 may check the whitelist file to determine if the particular executable file attempting execution is authorized. That is, if the determined hash key value for the particular executable file is located in the whitelist file, then the executable file may be considered authorized for execution by the processor 36. However, if the determined hash key value for the particular executable file attempting execution is not located in the whitelist file, then the industrial controller 12 may determine that the particular executable file is not authorized for execution. Furthermore, when the industrial controller 12 determines that any executable file in the memory 34 of the industrial controller 12 is not authorized, then an industrial controller security event may occur. As a result, the industrial controller 12 may generate and provide to the security server 38 a security notification including information (e.g., a timestamp, identifying information for the executable file attempting execution, identifying information for the whitelist file, a hash key value for the executable file attempting execution, or other suitable information) pertaining to the industrial controller security event.

Accordingly, as illustrated in FIG. 2, the security server 38 may generally receive security notifications from a number of different components (e.g., the device 24, the industrial controller 12, and other suitable devices) of the industrial control system 10. In certain embodiments, while aggregating the security notifications of the various components of the industrial control system 10, the security server 38 may store the security notifications received from the various components in the memory 40 of the security server 38. Furthermore, in certain embodiments, the security server 38 may compare and analyze the security notifications received from the various components of the industrial control system 10.

For example, it should be appreciated that a number of the illustrated industrial controller security events 52 are security events that may be generally complementary to certain HMI security events 50. As such, this feature should result in corresponding and/or complementary security notifications being provided to the security server 38 from multiple components of the industrial control system 10. Accordingly, in certain embodiments, the security server 38 may, for example, compare corresponding security notifications provided by the device 24 and the industrial controller 12 in order to verify consistency. That is, for example, the processor 40 of the security server 38 may ensure that a security notification provided by the device 24 in response to a user attempting to set or force a variable of the industrial controller 12 corresponds to a complementary security notification provided by the industrial controller 12 upon receiving the request to set or force the variable. Additionally, beyond checking for internal consistency, the processor 40 of the security server 38 may apply various heuristics to determine trends in the security notifications provided by the various components of the industrial control system 10. The security server 38 may apply heuristics to the security notifications to determine, for example, the time of the day, week, month, year, and so forth, that security events tend to occur, which components of the industrial control system 10 are most likely to produce security notifications, which components are most likely to trigger security notifications and other components of the industrial control system 10, and the like.

However, in certain embodiments, it may be desirable to, additionally or alternatively, provide the security notifications aggregated by the security server 38 to a remote device for comparison and analysis. For example, in certain embodiments, an industrial control system 10 may be supported by a managed security service provider (MSSP), which may generally provide support for the various security aspects of the industrial control system 10. Furthermore, the MSSP may operate a remote device 56 (e.g., located outside of the industrial control system 10), having a memory 58 and a processor 60, that may generally receive information regarding security concerns within the industrial control system 10. For example, the remote device 56 may receive the security notifications aggregated by the security server 38 in order to compare and analyze the security notifications for the industrial control system 10. As set forth above with respect to the security server 38, the remote device 56 may compare corresponding and/or complementary security notifications to verify consistency and may also apply heuristics to determine trends in the security notifications for the industrial control system 10.

Furthermore, for embodiments utilizing the remote device 56 to compare and analyze the security notifications for the industrial control system 10, the security server 38 may package the security notifications prior to delivering them to the remote device 56. For example, in certain embodiments, the security server 38 may add a number of security notifications to a single file and/or an archive of files to facilitate transport. Additionally, in certain embodiments, the security server 38 may additionally compress the security notifications (e.g., a file and/or archive containing the security notifications) to reduce the file size prior to transport. Furthermore, in certain embodiments, the security server 38 may additionally encrypt the security notifications so that the security notifications may be securely transferred to the remote device 56. In other embodiments, the security server 38 may, additionally or alternatively, utilize an encrypted network connection 62 to transfer the security notifications to the remote device 56.

Figure 3:
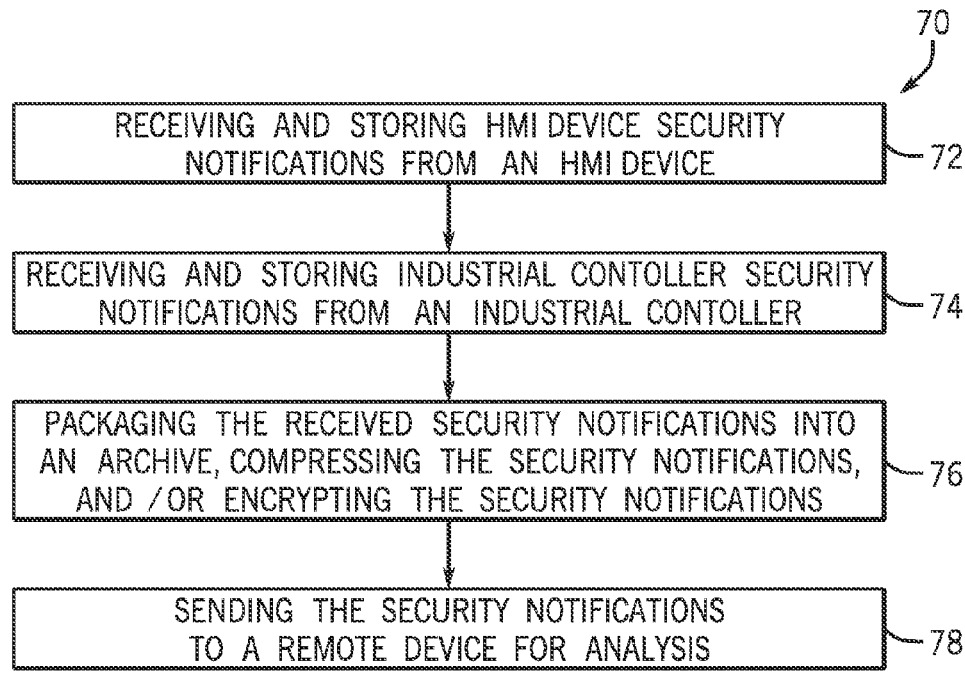
FIG. 3 is a flow diagram for an embodiment of a process which the security server aggregates, packages, and sends the security events from the industrial control system to a managed security service provider (MSSP) for analysis, in accordance with aspects of the present disclosure.

Turning to FIG. 3, a flow diagram is presented that illustrates an embodiment of a process 70 by which the security server 38 may collect security notifications from components of the industrial control system 10 and provide the security notifications to the remote device 56 for processing. The process 70 begins with the processor 40 of the security server 38 receiving (block 72) and storing (e.g., in memory 40) HMI device security notifications from the HMI device (e.g., device 24). At substantially the same time, the processor 40 of the security server 38 may also be receiving (block 74) and storing (e.g., in memory 40) industrial controller security notifications from the industrial controller 12. It should be appreciated that the security server 38 may receive security notifications from any suitable device in the industrial control system 10. Subsequently, the security server 38 may package (block 76) the received security notifications into an archive, the security server 38 may compress the security notifications, and/or the security server 38 may encrypt the security notifications. Then, the security server 38 may send (block 78) the packaged security notifications to the remote device 56 for comparison and analysis. In other embodiments, the security server 38 may, additionally or alternatively, compare and analyze the security notifications using the processor 42. Furthermore, in certain embodiments, the security server 38 may alternatively send security notifications directly to the remote device 56 as they are received without any substantial packaging.

Figure 4:
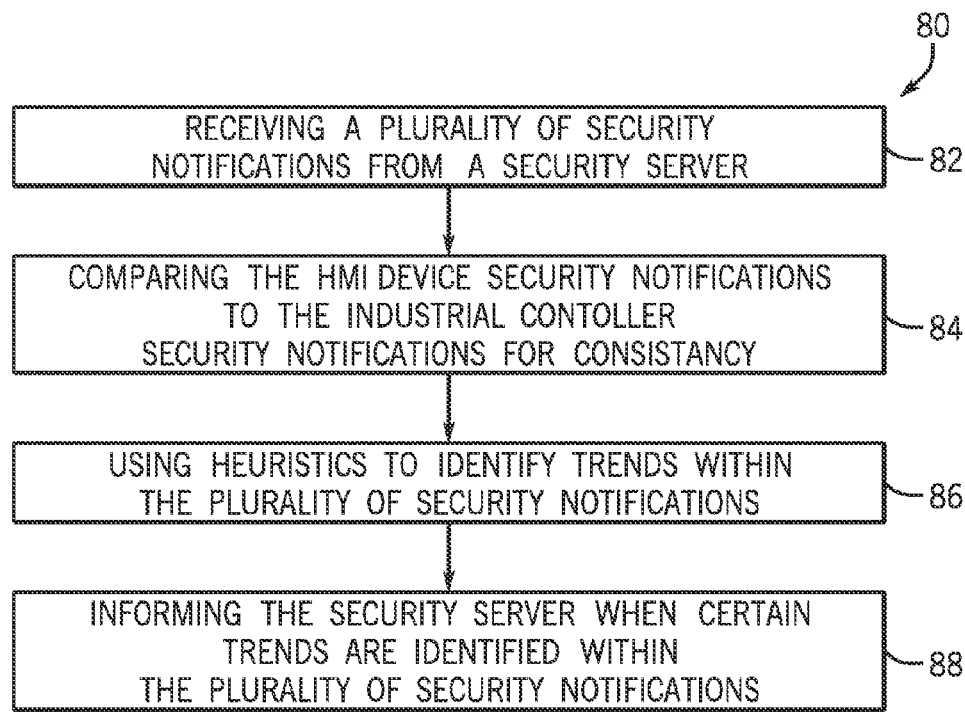
FIG. 4 is a flow diagram for an embodiment of a process which the MSSP analyzes the security events of the industrial control system to identify certain trends in the security event, in accordance with aspects of the present disclosure.

Turning to FIG. 4, a flow diagram is illustrated for an embodiment of a process 80 by which the remote device 56 may receive and analyze the security notifications from the industrial control system 10. The process 80 begins with the processor 60 of the remote device 56 receiving (block 82) a plurality of security events from the security server 38 of the industrial control system 10. Once received, the processor 58 of the remote device 56 may proceed with comparing (block 84) corresponding and/or complementary security events for consistency in the industrial control system 10. Additionally, the processor 58 of the remote device 56 may use (block 86) various heuristics to identify trends within the plurality of security events.

Furthermore, in certain embodiments, the remote system 56 may further inform (block 88) the security server 38 and/or the device 24 (e.g., the HMI 27 and/or the ToolboxST 32) when certain trends are identified within the security events. For example, once the remote system 56 has identified a potential security problem based on the analysis of the security notifications, the remote device 56 may inform the security server 38 of the security concern. By specific example, the processor 58 of the remote device 56 may determine, based on the comparison and/or analysis of the received security notifications, that a particular unauthorized executable file is attempting execution during a certain period of time on a recurring basis. Accordingly, the remote device 56 may inform the security server 38 and/or the device 24 of the security concern via a security alert, which may generally describe the security concern and suggest potential solutions. For example, the remote device 56 may provide a security alert to the industrial control system 10 (e.g., the security server 38 and/or the HMI 27 of the industrial control system 10) that includes the identity of the offending executable file, the identified trends for when the offending executable file is attempting execution, and other suitable information from the security notifications and/or analysis of the security notifications). It should be appreciated that in embodiments in which the comparison and/or analysis of the security notifications is performed solely by the security server 38, the security server 38 may inform the device 24 (e.g., the HMI 27 and/or the ToolboxST 32 of device 24) of any identified security concerns via a security alert in a similar manner.

Technical effects of the present embodiments include the aggregation of security notifications from a number of different components of an industrial control system 10 to a centralized security server 38. Furthermore, present embodiments of the security server 38 may provide comparison and/or analysis of the security notifications, packaging of the security notifications (e.g., including compression and/or encryption), transmitting the security notifications to a remote device, receiving security alerts from the remote device, and providing security alerts to a HMI 27 to inform one or more users of the HMI 27 of the security concern. Additionally, present embodiments of the remote device 56 may enable the comparison and/or analysis of the security notifications of the industrial control system 10 from a remote device 56 as well as providing security alerts to the security server 38 and/or the HMI 27 based on the comparison and/or analysis of the security notifications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial control system, comprising:
   a security server that is part of an industrial control network, wherein the security server comprises a memory and a processor configured to:
   receive a first set of communications from a human machine interface (HMI) device via the industrial control network, wherein the first set of communications relates to HMI device security events;
   receive a second set of communications from an industrial controller via the industrial control network, wherein the second set of communications relates to industrial controller security events;
   establish a network connection between the security server and a managed security service provider (MSSP) that is part of an external network separate from the industrial control network;

package and send, via the network connection, the first and second sets of communications to the MSSP for analysis;

receive, via the network connection, a security alert from the MSSP describing a security concern for the industrial control system identified by the MSSP during the analysis of the first and second sets of communications; and instruct the HMI to present the security alert to an operator.

2. The system of claim 1, comprising the HMI device having another memory and another processor configured to:
allow an authorized user to log onto the HMI device;
execute a configuration tool on the HMI device; and
provide the first set of communications relating to the HMI device security events to the security server.

3. The system of claim 2, wherein the HMI device security events relate to an attempt to log onto the HMI device, starting the configuration tool on the HMI device, executing a set of instructions on the HMI device, attempting to set a variable of the industrial controller from the HMI device, uploading executable files to the industrial controller from the HMI device, or a combination thereof.

4. The system of claim 1, comprising the industrial controller having another memory and another processor, configured to:
execute a plurality of executable files to control an industrial automation system;
receive and execute instructions provided by a configuration tool of the HMI device; and
provide the second set of communications relating to the industrial controller security events to the security server.

5. The system of claim 4, wherein the industrial controller security events relate to setting a variable, downloading executable files, a reboot, a startup failure, a communication error, or a detection of an unauthorized executable file, or a combination thereof.

6. The system of claim 1, comprising the MSSP having another memory and another processor configured to:
receive and analyze the first and second sets of communications;
identify trends in the first and second sets of communications indicative of the security concern; and
provide the security server with the security alert describing the security concern.

7. The system of claim 1, wherein the industrial control system comprises a gasification system, a gas treatment system, a turbine system, a power generation system, a heat recovery steam generation (HRSG) system, or a combination thereof.

8. The system of claim 1, wherein the security alert comprises suggested actions for the operator to take to address the security concern.

9. A method, comprising:
aggregating security logs using a security server of an industrial control system, wherein the security logs comprise security events for a plurality of devices of the industrial control system;
establishing a network connection between the security server and a managed security service provider (MSSP), wherein the MSSP is disposed on an external network separate from the industrial control system; and
packaging and sending the security logs from the security server to the MSSP via the network connection; and receiving, via the network connection, a security alert from the MSSP based on one or more security concerns identified by the MSSP during analysis of the security logs; and instructing one of the plurality of devices of the industrial control system to present the security alert to an operator.

10. The method of claim 9, wherein the plurality of devices comprises an industrial controller configured to control the industrial control system and a human machine interface (HMI) device configured to set variables on the industrial controller, to upload executable code to the industrial controller, and to present the security alert to the operator.

11. The method of claim 10, wherein the security events relate to setting a variable of the industrial controller, downloading executable files to the industrial controller, a reboot of the industrial controller, a startup failure of the industrial controller, a communication error of the industrial controller, or a detection of an unauthorized executable file by the industrial controller, or a combination thereof.

12. The method of claim 10, wherein the security events relate to an attempt to log onto the HMI device, executing a set of instructions on the HMI device, attempting to set a variable of the industrial controller from the HMI device, or uploading executable files to the industrial controller from the HMI device, or a combination thereof.

13. The method of claim 9, wherein packaging the security logs comprises packaging the security logs into an archive file, compressing the security logs, or any combination thereof.

14. The method of claim 9, wherein receiving the security alert comprises receiving the security alert from the MSSP when the MSSP determines that the security logs for two of the plurality of devices are not consistent with one another.

15. The method of claim 9, wherein establishing the network connection between the security server and the MSSP comprises establishing an encrypted network connection between the security server and the MSSP.

16. The method of claim 9, wherein packaging the security logs comprises encrypting the security logs before sending the security logs to the MSSP via the network connection, wherein the network connection is not an encrypted network connection.

17. The method of claim 9, wherein the security alert comprises suggested actions for the operator to take to address the one or more security concerns.

18. A tangible, non-transitory, computer-readable medium configured to store instructions executable by a processor of an electronic device, the instructions comprising:
instructions for a local processor of an industrial control network to receive security notifications from a human machine interface (HMI) device and an industrial controller of the industrial control network;
instructions for the local processor to establish a network connection to a remote processor of an external network that is separate from the industrial control network;
instructions for the local processor to send the received security notifications to the remote processor for analysis;
instructions for the local processor to receive, from the remote processor, one or more security alerts relating to security problems with the HMI device, the industrial controller, or both, based on the analysis; and
instructions for the local processor to instruct the HMI to present the security alert to an operator.

19. The medium of claim 18, wherein the remote processor is configured to analyze the security notifications from the HMI device and the industrial controller using at least one heuristic to determine the one or more security alerts.

20. The medium of claim 18, wherein the one or more security alerts comprises suggested actions for the operator to take to address the security problems.

\* \* \* \* \*